July 13, 1926.  
W. D. KMENTT  
1,592,372  
APPARATUS FOR TRANSFERRING ARTICLES IN ORDERLY ARRANGEMENT  
Filed July 6, 1925
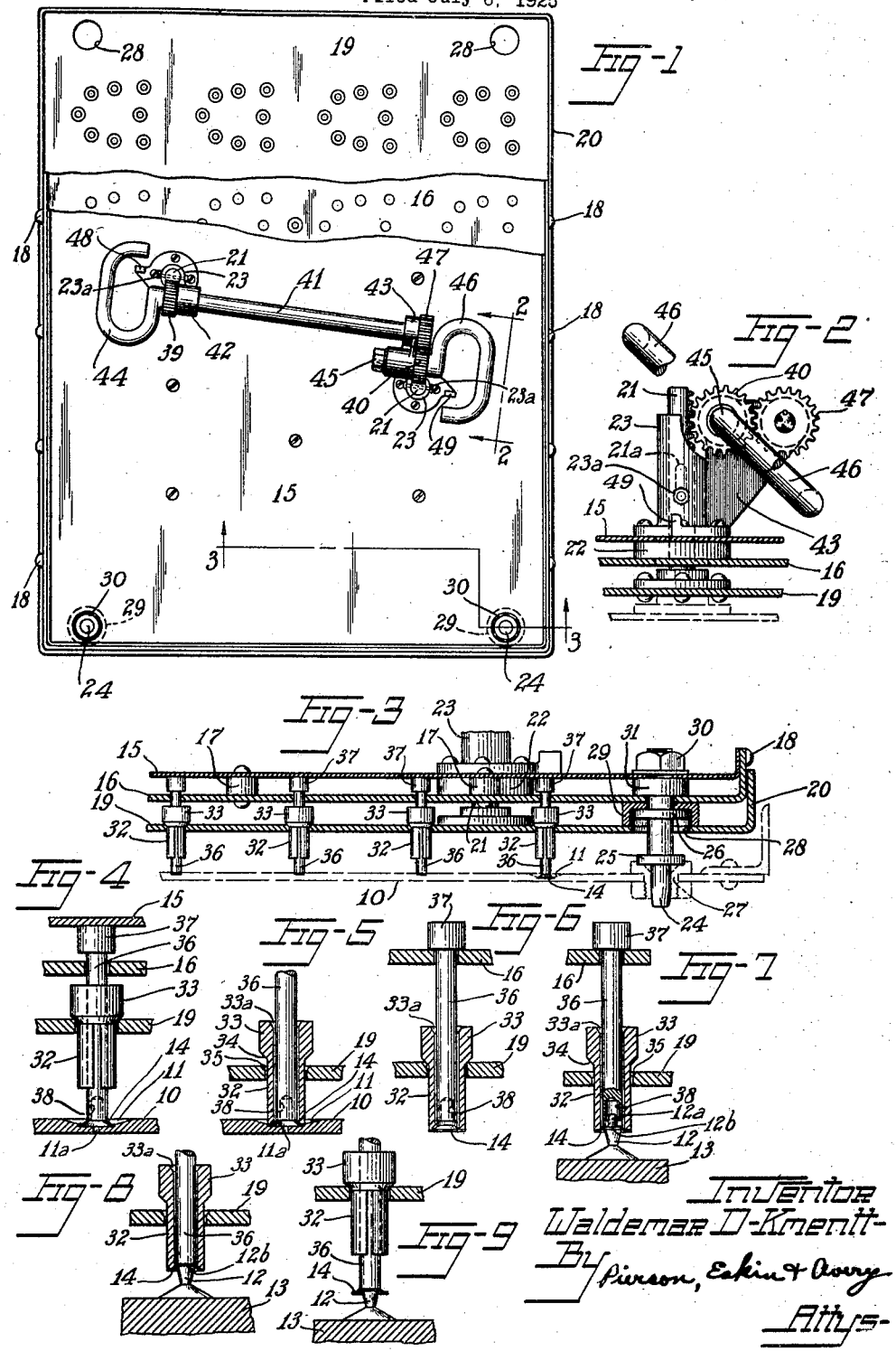

Patented July 13, 1926.

1,592,372

UNITED STATES PATENT OFFICE.

WALDEMAR D. KMENTT, OF AKRON, OHIO, ASSIGNOR TO THE B. F. GOODRICH COMPANY, OF NEW YORK, N. Y., A CORPORATION OF NEW YORK.

APPARATUS FOR TRANSFERRING ARTICLES IN ORDERLY ARRANGEMENT.

Application filed July 6, 1925. Serial No. 41,710.

This invention relates to the art of manipulating, handling or transferring articles in orderly arrangement, as in placing the nail-retaining washers of rubber heels upon the washer-supporting pins of the molds in which the heels are vulcanized.

Heretofore the washers, at a station apart from the mold, have been brought into relative positions corresponding to those of the mold pins by means of an inclined, recessed distributing plate, and then transferred in a group to the mold pins by means of a field of horseshoe magnets adapted to hold the respective washers against their lower faces, and the washers, after seating upon the respective pins, have been caused to remain thereon, while the magnets were withdrawn, by the weight of non-magnetic metal sleeves surrounding the respective magnets and lowered onto the washers before the withdrawal of the magnets.

In such procedure, so far as I am aware, the magnet has contacted only the central portion of the washer, the margin of the washer projecting therefrom so as to be abutted by the non-magnetic sleeve to dislodge it from the magnet, and the sleeve has been caused to bear upon the washer with only its own force of gravity and inertia, which has prevented the use of very strong magnets and consequently has resulted in frequent dropping of washers from the magnets. The similar grouping of the magnets and of the mold pins has had to be very accurate to permit the numerous washers to be guided simultaneously onto the respective pins, and frequently a considerable percentage of the washers have failed to seat properly upon the pins or have fallen into the mold, between the pins, which has required time and care in recovering them and placing them upon their pins by hand, especially as the mold is usually still hot from the preceding vulcanizing operation.

My general object is to provide improved procedure and apparatus for operations such as that described. More specific objects are to provide for more complete and uniform effectiveness of the several washer-manipulating units in transporting the washers and seating them upon the pins, and to provide for successful operation notwithstanding inaccuracy in the positions of the mold pins such as is usually present in the heel molds used, especially after they have been in service for some time.

In attaining these objects I have discovered that the imperfect operation of the prior apparatus described has been due largely to the fact that the magnet contacts only the central portion of the washer, with the margin of the washer projecting beyond the magnet, so that when a slightly misaligned mold pin strikes the washer at a distance from the latter's center it may exert a prying force upon the washer and dislodge the latter from the magnet instead of properly entering the hole in the washer, the washer being backed, from above, only by the magnet contacting its central portion.

I have overcome this difficulty by employing a magnet of such size and shape as to attract the washer more strongly and to contact a considerable portion of the outer margin of the washer, more effectively backing and stabilizing the latter against the force of an off-center mold pin. I find that the magnet can be given substantial play in its support, so as to permit the washer to guide itself onto the pin, especially when the washer is of the conical type and consequently provides the aligning effect of its funnel-like inner surface in addition to that of the tapered end of the pin, and also especially when the washer is backed near its outer margin, instead of at its center, against the force of the pin.

For holding the washer upon the pin while the magnet is withdrawn I provide a clamping bar of non-magnetic material such as aluminum mounted between the poles of the magnet and adapted to contact the central portion of the washer to clamp it upon the pin, the bar being formed with a recess in its lower end to accommodate the upper end of the mold pin.

I provide positive means for holding the bar upon the washer, which permits the washer to be positively and securely held upon the pin by the bar while the magnet is withdrawn and also provides, in the picking up of the washers from the distributing plate, for positively holding the washer in the recess of the plate until the magnet is lowered onto the washer, so as to avoid jumping of the washers into contact with the magnets and consequent inaccuracies in the positioning of washers on the magnets.

The provision of positive means for holding the clamping bar against the washer, and also the mounting of the clamping bar within the magnet, permits the use of relatively large and strong magnets.

I also provide improved means for raising and lowering the field of magnets with relation to their plungers, adapted to avoid accidental dislodging of the washers from the magnets during the transferring operation.

Of the accompanying drawings:

Fig. 1 is a plan view of a washer-transferring device embodying and adapted to carry out my invention in a preferred form, parts being broken away.

Fig. 2 is a section of the same on line 2—2 of Fig. 1, parts being shown in elevation and broken away.

Fig. 3 is a section, on line 3—3 of Fig. 1, of the device as it appears when presented to the distributing plate, the latter being shown in broken lines.

Fig. 4 is a vertical section of portions of the transferring device and distributing plate, showing one of the washer-manipulating units in the washer-receiving position of Fig. 3, but on a larger scale.

Fig. 5 is a similar section showing the later stage at which the magnet has been lowered onto the washer.

Fig. 6 is a similar section showing the next stage, at which the clamping bar has been raised with relation to the magnet and the latter, with the rest of the transferring device, has been raised from the distributing plate, the washer being held by attraction to the magnet.

Fig. 7 is a vertical section of parts of the transferring device and the heel mold, showing one of the washer-manipulating units as it appears when the washer is introduced to the mold pin.

Fig. 8 is a similar section showing the next stage, when the clamping bar has been lowered and is held against the washer.

Fig. 9 is a similar section showing a later stage, at which the magnet has been lifted from the washer, the latter being held upon the mold pin by the clamping bar.

Referring to the drawings, the washer-distributing plate is shown at 10 and is formed with recesses such as that shown at 11, said recesses being positioned in the plate in accordance with the relative positions of the washer-receiving pins, such as that shown at 12, in the heel mold 13.

Each recess 11 is so formed with a sloping entrance and with vertical walls as to permit conical washers such as that shown at 14 to pass into and out of the recess without lodging when the base of the washer is uppermost, but to catch and retain a washer, and preferably only one, passing into the recess with its base downward, when the plate, mounted in an inclined position, is shaken to cause a supply of washers dumped on its higher margin to slide down over its inclined upper surface. Pilot holes 11ª preliminarily formed in the plate 10 for the drilling of the recesses 11 serve to permit the escape of grit and dirt from the recesses.

The washer-transferring device comprises two upper clamp-actuating plates 15, 16 held spaced apart by spacer blocks such as 17, 22 and 31 and by marginal flanges formed on the two plates respectively and secured together in telescoped relation by means of rivets 18, 18. A lower, magnet-supporting plate 19 is formed with a marginal flange 20 telescoped upon that of the plate 16 to guide it with relation thereto in its relative vertical movement. Racks 21, 21 are secured to the upper face of the plate 19 and each rack slidably extends upward through apertures in the plates 16, 15 and a spacer block 22 between the two, and through a guide sleeve 23 secured to and rising from the uppermost plate 15, means being provided for actuating said racks to raise and lower the magnet-supporting plate 19 with relation to the clamp-actuating plates 15, 16.

For positioning the transferring device upon the distributing plate 10 a dowel pin 24, formed with flanges 25, 26, is mounted on the transferring device at each corner thereof and is adapted to enter a guide bushing 27 mounted in the distributing plate. The flanges 25 are adapted to rest upon the bushings 27 to limit the movement of the plates 15, 16 toward the distributing plate 19 at the respective corners of the device and the flange 26, admitted in the assembling of the device, through an aperture 28 in the plate 19, serves to clamp against the lower face of the plate 16 a flanged washer 29, the four washers 29 being adapted to limit the relative upward movement of the plate 19 at the four corners of the device, and the flange 26 serves to sustain the force of a nut 30 screwed onto the upper end of the dowel 24 and clamping the plates 15, 16 against a spacer block 31.

The magnets, of the horse-shoe type, are shown at 32, 32. Each is mounted with substantial play in an aperture in the plate 19 and is formed with a taperedly apertured supporting head 33 resting upon the upper surface of said plate, the tapered aperture being designated 33ª. The annular, lower face of the head is preferably beveled as shown clearly at 34 in Fig. 5 and the aperture in the plate 19 is complementally beveled, as shown at 35, Fig. 5, in order that the magnet will center itself therein when hanging from the plate.

The clamping bars are shown at 36, 36. Each is mounted with substantial play in an aperture in the plate 16, extends with substantial play through the apertured head 33 of its magnet 32, and is formed with a supporting-head 37 lying between the plates 15, 16 and having limited vertical play between the two to permit it to move freely in the aperture of the plate 16 and to permit one of the bars to rise higher than others in case it encounters two washers instead of one in the recess of the distributing plate. The lower end of the clamping bar is formed with a central recess 38 in its lower end face, adapted freely to receive the upper end portion 12$^a$ of the mold pin, above the latter's washer-supporting shoulder 12$^b$.

The parts of the device are so proportioned as to permit the magnets 32 to be lowered until their lower ends are below the lower ends of the clamping bars 36, as in Fig. 5, 6, 7 or 8, or raised until the clamping bars project below their lower ends, as in Fig. 3, 4 or 9. The tapered apertures 33$^a$ facilitate the assembling of the parts by guiding the clamping bars into the magnets, and the play between the bars and the magnets and between each of them and its supporting plate permits the relative movement necessary for their automatic alignment with the individual mold pins.

For raising and lowering the magnet-supporting plate 19 the racks 21, in their positions above the plate 15, are meshed with respective pinions 39, 40 (Figs. 1 and 2), the pinion 39 being secured upon a turn-bar 41 journaled in brackets 42, 43 formed upon the respective guide sleeves 23, said turn-bar being formed with a handle portion 44. The pinion 40 is secured upon a short turn bar or stem 45 journaled in the bracket 43 and formed with a handle portion 46, and the pinion 40 is meshed with a pinion 47 secured upon the adjacent end of the turn bar 41. Stops 48, 49 are formed on the bases of the guide sleeves 23 and adapted to be abutted by the handles 44, 46 respectively to position the pinions for proper remeshing with the racks in reassembly of the device. The range of relative movement between the plates 16 and 19 at the positions of the racks is determined by bolts 23$^a$, 23$^a$, mounted in the guide sleeves 23 and extending through slots 21$^a$ formed in the racks.

The construction is such that the racks are compelled to move equally and the handles 44, 46 are adapted to be turned in opposite directions for raising or lowering the magnet-supporting plate 19, so that the turning forces upon the two largely neutralize each other as to their resultant force upon the transferring device as a whole, this construction being desirable in order to avoid unintended movements of the device as a whole in rapid operation, and as the turning axes of the handles are horizontal the turning forces are applied in vertical planes, so that the magnets may be held relatively lifted by simply supporting the device by the oppositely disposed open ends of the handles, as will be clear upon reference to Fig. 1, and the clamping bars may be held relatively lifted by supporting the device by the closed ends of the handles. Thus accidental actuation of the device in transit may readily be avoided. The positive gearing between the racks prevents cramping and binding of the sliding elements upon each other.

In the operation of the apparatus the distributing plate 10, with the transfer device removed therefrom, is supported in an inclined position and a supply of loose washers 14 are dumped thereon at its upper side. The plate is then shaken or jarred, which causes the supply of washers to slide downward over its inclined surface and certain of the washers, having their bases downward, lodge in the respective recesses 11, while excess washers slide past the recesses and washers lodged therein and drop from the lower margin of the plate.

The transferring device, with the magnets 32 raised, as in Figs. 3 and 4, is then lowered onto the plate 10, the dowels 24 entering the bushings 27, and the projecting clamping bars 36 coming to rest upon the respective washers and holding them in their recesses. The handles 44, 46 are then turned to lower the magnets onto the washers, the plate 19 preferably being lowered until it leaves the heads 33 of the magnets while the latter rest upon the washers, as shown in Fig. 5.

The entire transfer device is then lifted from the distributor plate 10, the clamping bars 36 being thereby lifted from the washers before the magnets, carrying the washers, are lifted by the lowered plate 19, as shown in Fig. 6.

The transfer device is then moved over the mold 13 and lowered thereonto, the dowels 24 entering suitable apertures in the mold, and the magnets lower the washers onto the respective pins, the washers serving as guides by reason of the play of the magnets and clamping bars, and the heads of the magnets are raised slightly from their relatively lowered supporting plate by contact of the washers 14 with the shoulders 12$^b$ of the mold pins, as shown in Fig. 7. As the plates 15, 16 reach their lowermost position the clamping bars 36 come to rest upon the washers, as shown in Fig. 8, to hold them upon their pins while the magnets are lifted.

The handles 44, 46 are then turned to raise the magnet-supporting plate 19 with relation to the plates 15, 16 and clamping bars 36, so that the magnets are lifted from the washers as shown in Fig. 9 while the clamping bars hold the washers upon the pins, whereby the attraction of the magnets for the washers is broken, after which the entire transfer device is lifted from the mold, leaving the washers upon the pins. Each magnet, although strongly magnetized carries only a single washer, so that all of the washers may be simultaneously clamped against the shoulders 12$^b$ of the mold pins by the weight of the entire device upon the clamping bars, and both the clamping force and the relative lifting of the magnets are positive.

By the improvements described I have obtained greatly improved results, as set out in the above introduction, both as to the percentage of pins successfully supplied with washers at each operation and as to the tolerances permitted in the relative positions of the mold pins and also as to accidental dropping of washers during the transferring operation.

Various modifications may be employed without departing from the scope of my invention and I do not wholly limit my claims to the exact construction or procedure described.

I claim:

1. Apparatus for manipulating articles of magnetic material, said apparatus comprising a magnet for lifting the article, means adapted to contact the upper face of the article for dislodging it from the magnet, the magnet being adapted to contact the article on substantially opposite sides of the dislodging means, and a common mounting for the magnet and the dislodging means.

2. Apparatus for mounting washers upon mold pins, said apparatus comprising a horseshoe magnet adapted to lift the washer while contacting it near its outer periphery, and a non-magnetic member adapted to contact the upper face of a more central portion of the washer to dislodge it from the magnet.

3. Apparatus for mounting washers upon mold pins, said apparatus comprising a horseshoe magnet for lifting the washer and a non-magnetic member slidably mounted between the arms of the magnet and adapted to contact the washer between the poles of the magnet to dislodge the washer from the magnet.

4. Apparatus for mounting washers upon mold pins, said apparatus comprising a magnet for lifting the washer, means for so pendently supporting the magnet as to permit the washer held thereby to align itself with the pin by contact with the latter as the washer, held by the magnet, is lowered thereonto, and means adapted to contact the upper face of the washer for dislodging it from the magnet.

5. Apparatus for mounting washers upon mold pins, said apparatus comprising a magnet adapted to contact outer marginal portions of the washer and a non-magnetic member adapted to contact the upper face of a more central portion of the washer to dislodge it from the magnet, and means for so pendently supporting the magnet and the dislodging means as to permit them to be moved laterally by contact of the mold pin with the washer to align the latter with the pin as it is lowered thereunto.

6. Apparatus for mounting washers upon mold pins, said apparatus comprising a magnet for lifting the washer and adapted to contact its outer marginal portions, a non-magnetic member adapted to engage the upper face of a more central portion of the washer to dislodge it from the magnet, and means for positively effecting relative washer-dislodging movement of the two.

7. Apparatus for mounting washers upon mold pins, said apparatus comprising a plate, a set of magnets mounted thereon and adapted to lift respective washers to transfer them to the pins, a second plate mounted to slide toward and from the first said plate in registered, parallel relation thereto, a set of washer-dislodging members mounted upon the second plate and adapted to dislodge the washers from the magnets, and means operatively connecting the two plates to move them from and toward each other, the last said means including a pair of handle members and drive means positively connecting the two handle members to compel them to move equally.

8. Apparatus as defined in claim 7 in which the plate-actuating means comprises a pair of racks and gearing positively connecting said racks.

9. Apparatus for mounting washers upon mold pins, said apparatus comprising a plate, a set of magnets mounted thereon and adapted to lift respective washers to transfer them to the pins, a second plate mounted to slide toward and from the first said plate in registered, parallel relation thereto, a set of washer-dislodging members mounted upon the second plate and adapted to dislodge the washers from the magnets, and means operatively connecting the two plates to move them from and toward each other, the last said means including a pair of handle members adapted to be turned in opposite directions on horizontal axes to effect a single relative movement of the plates.

10. Apparatus as defined in claim 9 in which the magnet is adapted to contact outer marginal portions of the washer.

In witness whereof I have hereunto set my hand this 29th day of June, 1925.

WALDEMAR D. KMENTT.